United States Patent [19]

Blake

[11] Patent Number: 5,135,312

[45] Date of Patent: Aug. 4, 1992

[54] TEMPERATURE TRANSDUCER

[75] Inventor: Graeme A. Blake, Bellevue, Wash.

[73] Assignee: Sundstrand Data Control, Inc., Redmond, Wash.

[21] Appl. No.: 555,903

[22] Filed: Jul. 20, 1990

[51] Int. Cl.⁵ ............................................. G01K 11/22
[52] U.S. Cl. .................................. 374/117; 310/333; 310/367; 374/183
[58] Field of Search ............... 374/117, 118, 119, 183; 310/367 X, 333 X, 361; 331/66, 156, 163, 154

[56] References Cited

U.S. PATENT DOCUMENTS

| | | | |
|---|---|---|---|
| 736,952 | 8/1903 | Fox | 416/90 X |
| 1,993,701 | 3/1935 | Avery | 416/120 |
| 2,064,845 | 12/1936 | Moray et al. | 416/228 |
| 2,646,974 | 7/1953 | Read | 416/228 |
| 2,651,480 | 9/1953 | Pullin | 416/130 |
| 3,906,260 | 9/1975 | Oguchi | 310/9.6 |
| 4,139,793 | 2/1979 | Michal | 310/353 |
| 4,178,566 | 12/1979 | Kawashima | 331/156 |
| 4,215,570 | 8/1980 | Eer Nisse | 73/141 R |
| 4,216,402 | 8/1980 | Engdahl | 310/320 |
| 4,368,402 | 1/1983 | Torri et al. | 310/367 |
| 4,436,773 | 3/1984 | Dinger et al. | 374/117 |
| 4,450,378 | 5/1984 | Hermann et al. | 310/361 |
| 4,455,502 | 6/1984 | Nakatani | 310/367 |
| 4,511,821 | 4/1985 | Nakamura et al. | 310/354 |
| 4,562,375 | 12/1985 | Besson et al. | 310/338 |
| 4,583,063 | 4/1986 | Milsom | 310/367 |
| 4,654,663 | 3/1987 | Alsenz et al. | 340/870.3 |
| 4,658,174 | 4/1987 | Albert | 310/323 |
| 4,772,130 | 9/1988 | Ueda et al. | 374/117 |

Primary Examiner—William A. Cuchlinski, Jr.
Assistant Examiner—G. Bradley Bennett
Attorney, Agent, or Firm—Christensen, O'Connor, Johnson & Kindness

[57] ABSTRACT

A vibrating crystal transducer for measuring temperature including a bonding area from which three or more tines extend. The tines have a torsional mode resonant frequency that is a function of temperature. Electrodes on the transducer excite the tines into vibration so that the torsional moments of the adjacent edges of the adjacent tines are reverse symmetric. When the tines are vibrated, the reverse symmetrical vibrational moments of the individual tines cancel so that there is no torsional moment, or twisting, within the area between the points where the tines intersect, which is the area defined by the bonding area. Since the bonding area does not serve as a sink for torsional energy, torsional energy is not lost through the bonding area so that the transducer has a relatively high quality factor and torsional vibration of the transducer cannot cause the transducer to eventually work loose of a mounting pad to which it is attached.

30 Claims, 2 Drawing Sheets

TEMPERATURE TRANSDUCER

FIELD OF THE INVENTION

This invention relates to vibrating transducers used to monitor temperature, and, more specifically, to a vibrating temperature transducer that vibrates in the torsional mode.

BACKGROUND OF THE INVENTION

Vibrating crystal transducers are frequently used in modern sensors to provide an electrical signal representative of temperature. Vibrating crystals may be formed out of piezoelectric material. When a voltage is applied, this material stresses such that the shape of the material is deformed and, conversely, when a stress is developed on the material, a voltage develops on the surface of the material. A vibrating crystal has a frequency, called resonant frequency, at which the cyclical stressing results in a peak admittance, the minimal impedance, to the applied voltage. In some crystals, the resonant frequency is not constant, but varies with respect to the temperature of the crystal. Temperature sensors that employ vibrating crystal transducers operate by applying a voltage to the crystal to establish its resonant frequency which, in turn, is measured as an indication of the temperature of the crystal and the surrounding environment.

Many vibrating crystal transducers are in the shape of a miniaturized tuning fork with two tines that are connected together at a common base which is firmly secured to a sensor frame. Electrodes on the tines and/or the base portion of the crystal provide the necessary phase and amplitude of voltage to cause the tines to vibrate at a stable amplitude. Vibrating crystal transducers used in temperature sensors are usually arranged to vibrate in the torsional mode, wherein the movement of each tine is a rotation, or twist, about the longitudinal axis of the tine. When such a vibrating crystal transducer is electrically excited, the tines vibrate symmetrically with respect to each other. In other words, one tine rotates clockwise and the other rotates counterclockwise. In a subsequent phase of vibration, the orientations of the rotation of the individual tines are reversed.

Torsionally vibrating crystal transducers have large temperature coefficients that make it possible for the transducers to provide extremely accurate temperature measurements. Torsionally vibrating crystal transducers also vibrate at high frequencies, around 250 KHz, in comparison to other vibrating crystals, for instance, flexurally vibrating crystals that vibrate at approximately 35 KHz. The high resonant frequencies of torsionally vibrating crystals are sharply defined, which simplifies determining the exact instantaneous resonant frequency of the crystals. Thus, for many purposes, where extremely accurate temperature measurements are required, torsionally vibrating crystal transducers are a preferred type of temperature sensor.

Moreover, torsionally vibrating crystal transducers are basically insensitive to acceleration. This feature makes the crystals readily suited for placement in vehicles and other moving objects where it is desirable to measure environmental temperature, since there is little possibility the crystals will be affected by the movement of the object. For example, torsionally vibrating crystals are well suited for incorporation in acceleration units where the temperature measurement they provide is used to compensate for temperature variation in vibrating crystals used to measure acceleration.

A disadvantage of the conventional tuning fork type crystal temperature transducers is that the energy of the torsional motion of the individual tines about parallel but not co-linear axes is transferred directly to the base in the form of an antisymmetric pair of bending moments. The bending of the base results in a loss of the energy applied to excite the tines to vibrate. Consequently, relatively high voltages must be applied to the crystal in order to sustain resonant vibration of the tines. The bending of the base, and consequent loss of energy, lowers the overall quality factor of the crystal, which is a measure of sharpness or narrowness of the range of frequencies at which, at a given instant, the crystal may resonate. A crystal that, at a given instant, has only a very narrow, sharply defined resonant frequency has a high quality factor. A crystal with a broader, less defined resonant frequency is said to have a low quality factor. A low quality factor results in a less precise measurement of temperature. Moreover, a crystal with a low quality factor is more easily distrubed by environmental factors other than temperature.

Another disadvantage of a conventional tuning fork crystal is that it is sensitive to the mounting conditions at the point where its base is attached to the sensor frame. This sensitivity means that variations in mountings cause the quality factor of individual crystals to differ. These individual variations in crystal quality factor increase the difficulty of optimizing the oscillator electronics when the crystals are installed in temperature sensor assemblies.

Furthermore, the vibrational energy transferred to the base of the crystal is transferred through a sensor frame to adjacent transducers, for example, adjacent vibrating crystal transducers used to measure force in accelerometers. The energy transferred to the adjacent transducers can adversely affect the ability of these transducers to accurately provide signals representative of the parameters they are designed to monitor. Still another problem associated with vibrational energy transferred to the base is that, over time, the induced bending can significantly weaken the bond between the crystal and the sensor frame. The weakening of this bond can cause the resonant frequency of the crystal to change radically, and can even cause the crystal to break free of the body. In either case, the loosening of the crystal-to-sensor frame bond will render the transducer virtually useless for the purpose of making temperature measurements.

Moreover, since the crystal-to-sensor frame bond is so delicate, and because the crystal itself is so small, a temperature sensor assembly that includes a torsionally vibrating crystal is often very fragile. This has made it difficult to use a sensor with a torsionally vibrating crystal temperature transducer in an environment where the sensor would be subjected to significant mechanical shock.

An alternative to providing traditional tuning fork type vibrating crystals has been to provide beam-shaped crystals arranged so that the opposed half-sections of the beam vibrate torsionally with equal and opposite moments. The vibrational forces cancel out along a nodal line located at the center of the beam. Consequently, along the nodal line the beam does not vibrate, and therefore, energy is neither removed from nor taken out of the beam through the nodal line. A limitation associated with these crystals is that their vibration-free areas are quite narrow, merely the width of their nodal lines. In order to secure most vibrating beam crystals in place, these beams are often attached to the adjacent sensor frame along a line significantly wider than the width of a nodal line. Thus, even though beam-shaped vibrating crystal transducers are useful for eliminating some of the undesirable energy transfer to and from the transducer, they are not capable of blocking all of the energy transfer.

SUMMARY OF THE INVENTION

This invention comprises a vibrating transducer constructed so that the torsional forces of the transducer cancel each other out, and bending in a wide portion of the transducer is essentially eliminated. The temperature transducer of this invention has a central base, or bonding area, from which at least three tines outwardly project. Voltages are applied to the tines so that they have torsional moments that, at any instant, are identical in both direction and degree. The transducer may be secured at its bonding area to a mounting pylon that is integral with a sensor housing.

When a voltage is applied to this transducer, the tines vibrate, or twist, about their longitudinal axes in the same direction, and to the same extent, at the same time. Along the adjacent edges of any two adjacent tines, the twisting moment of one tine is equal and opposite, or reverse symmetric, with respect to the twisting moment of the adjacent tine. At locations where the twisting moments of the adjacent tines intersect, they cancel each other out. Consequently, at these locations, the twisting of the transducer is substantially eliminated. These locations define the bonding area of the transducer. Since the perimeter of the bonding area is essentially not excited into torsional movement, this portion of the transducer similarly remains motionless. Consequently, within this area, the bonding area, energy is neither transferred from nor to the tines when they are excited into torsional vibration.

Since almost no torsional energy is lost into the bonding area, only a minimal amount of energy is required to be supplied to the crystal in order to maintain resonant vibration. Thus the crystal temperature transducer of this invention has a relatively high quality factor. Furthermore, since the bonding area does not bend, torsional energy is not transferred through the bonding area to adjacent sensors where it can adversely affect the sensing capability of those transducers. Moreover, since only a minuscule amount of energy is lost when the crystal is secured to a mounting pylon, the crystal has substantially identical mounted and unmounted resonant frequencies. This simplifies assembling the crystal into a temperature sensor assembly.

Still another advantage of this invention is that the bonding area presents a relatively wide unbending surface for attaching the crystal to a sensor housing. Thus, the crystal stays firmly secured to the sensor frame regardless of the tines' vibrations. Consequently, this crystal is especially well suited for use in environments where precise temperature measurements are required and a sensor would be subjected to significant amounts of mechanical shock.

BRIEF DESCRIPTION OF THE DRAWINGS

The invention will be pointed out with particularity in the appended claims. The above and further advantages of the invention may be better understood by reference to the following detailed description taken in conjunction with the accompanying drawings, in which:

DETAILED DESCRIPTION OF THE INVENTION

Figure 1:
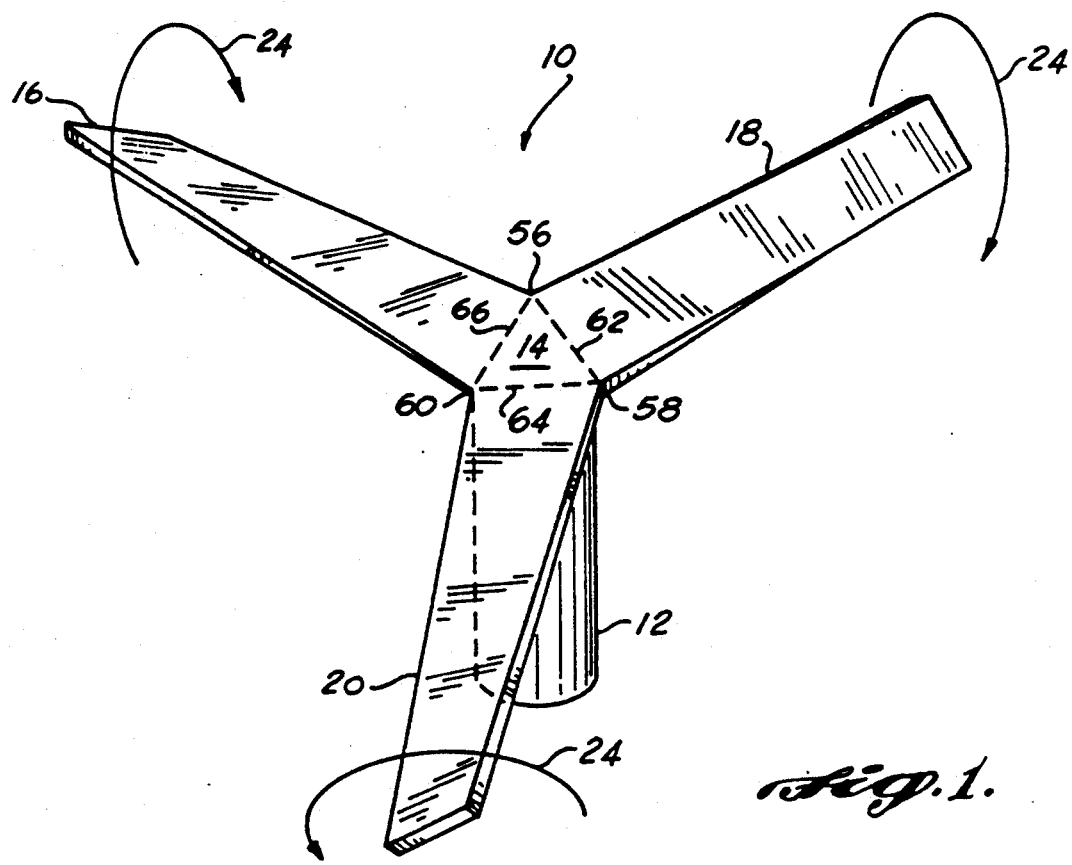
FIG. 1 is a perspective view of the temperature transducer of this invention vibrating in the torsional mode.

FIG. 1 illustrates one preferred embodiment of a temperature transducer 10 of this invention secured to a mounting pylon 12. Temperature transducer 10 is an integral piece of crystal comprising a centrally located bonding area 14, in the shape of an equilateral triangle, and three beam shaped tines 16, 18, and 20 that project outward from the sides of the bonding area. The temperature transducer 10 is formed out of quartz or other suitable piezoelectric material having three-fold symmetry. By three-fold symmetry it is meant that the material's molecular structure is such that, when the material is rotated 120° about the axis of the pylon 12, its molecules appear to be in the same orientation as when the material was in its initial position. Mounting pylon 12 is part of a sensor housing 22, in which the transducer 10 is contained. The mounting pylon 12 extends upward from a portion of the housing 22 that defines a cavity in which the crystal is housed. Transducer 10 is secured to the mounting pylon 12 at the bonding area 14 by an adhesive or other means known in the art to secure crystals. In the depicted embodiment, mounting pylon 12 is shown as being cylindrical; in other embodiments of the invention the mounting pylon may have different cross sectional profiles. In the preferred embodiments of the invention, an essential feature of the mounting pylon is that it has a cross sectional area that allows it to be attached to the crystal so that it is entirely within the bonding area 14.

A voltage is applied to the transducer 10 so as to cause each tine 16, 18 and 20 to twist about its longitudinal axis, as represented by arrows 24, in the same direction, and with the same degree of displacement, at the same instant. As a result of this motion, the vibrational moments of the adjacent edges of any two adjacent tines 16, 18 or 20 are equal and opposite, or reverse symmetric, with respect to each other. Since these moments are reverse symmetric, where the torsional moments of two adjacent tines 16, 18 or 20 intersect, the moments cancel and the transducer 10 is essentially motionless. The locations where the torsional moments of the individual tines 16, 18 and 20 intersect define the bonding area 14. Since the perimeter of the bonding area 14 basically does not vibrate, the area within it is similarly motionless.

Figure 2:
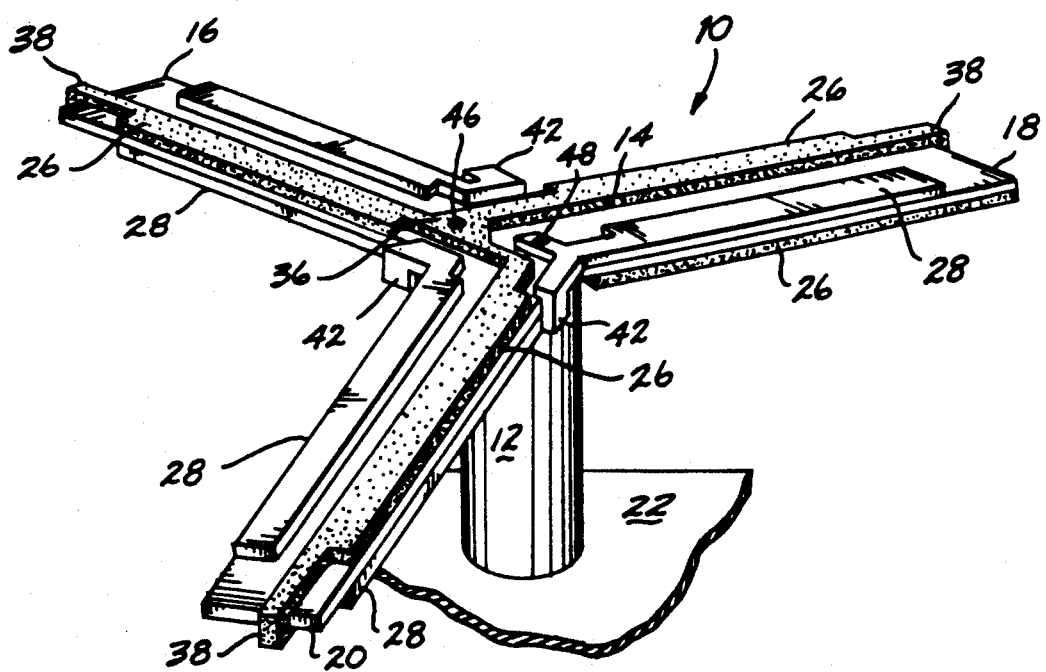
FIG. 2 is a perspective view of the temperature transducer of FIG. 1 showing the placement of electrodes thereon.
Figure 3:
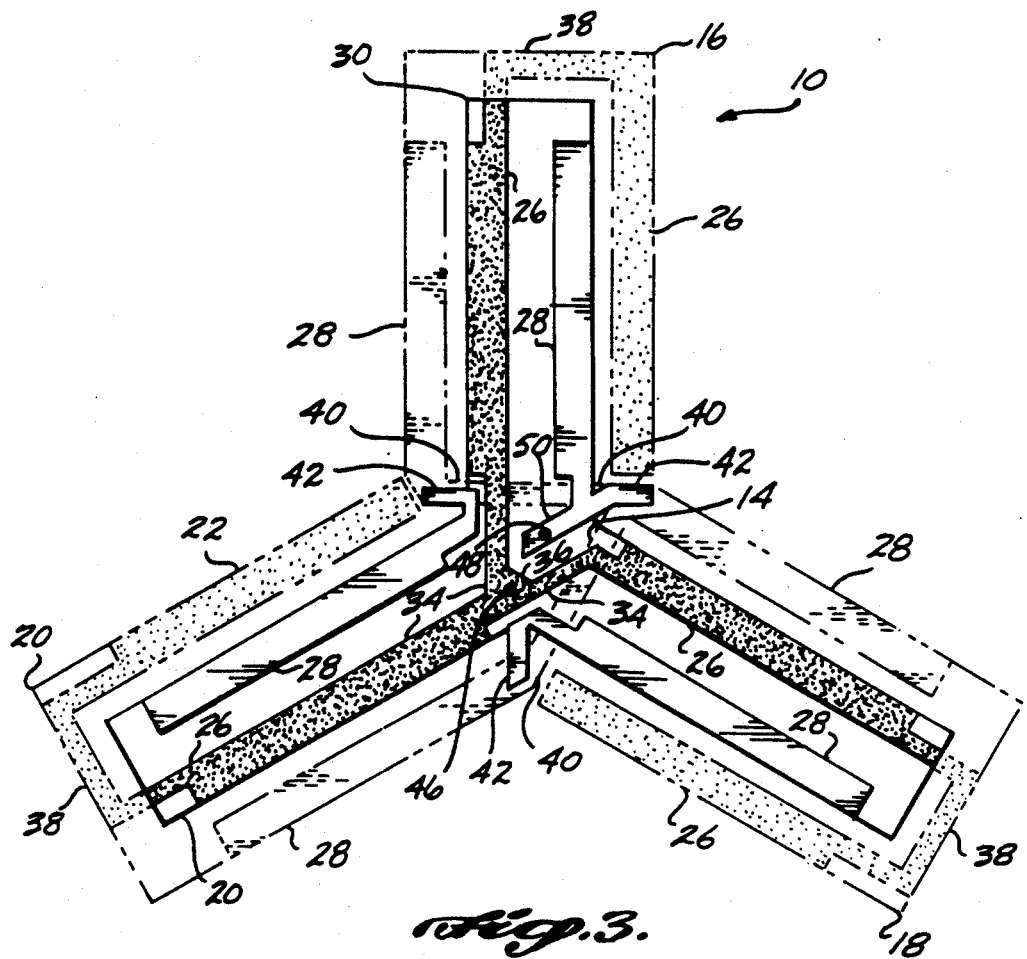
FIG. 3 is an unfolded topological schematic representation of the placement of electrodes on the temperature transducer of FIG. 1.

FIGS. 2 and 3 illustrate the placement of electrodes 26 and 28 on the transducer 10 for applying voltages to the tines 16, 18 and 20. In FIG. 2, the thickness of the electrodes 26 and 28 is exaggerated for purposes of illustration. FIG. 3 is an "unfolded" view wherein the top surface of the transducer 10 is depicted as the portion of the transducer within solid border 30. The sides and bottom surface of the transducer 10, including the electrodes 26 and 28 thereon, are depicted in phantom. Each tine 16, 18, and 20 has two electrodes 26 depicted by stippling. Each tine 16, 18, and 20 also has two electrodes 28 depicted by shading. Conductors, which connect the same polarity electrodes 26 or 28, are depicted as having relatively narrow widths in comparison to the electrodes and have the same shading as the associated electrodes. Electrodes 26 and 28 and conductors on the top surface of the transducer 10 are depicted by normal shading. Electrodes 26 and 28 and conductors on the sides and bottom surface of the transducer 10 are depicted by phantom shading.

The electrodes 26 and 28 are arranged in an alternating pattern on each surface of the transducer 10 and in an alternating pattern between surfaces of the transducer. Thus, on each tine 16, 18, and 20 the individual electrodes 26 are located diametrically opposite each other and the individual electrodes 28 are located diametrically opposite each other.

Electrodes 26 and 28 are arranged on transducer 10 so that neither they nor their associated conductors cross. The top surface electrodes 26 are connected by three conductors 34 that meet in a triangle 36 on the top of the bonding area 14. Conductors 38 that wrap around the ends of each tine 16, 18, and 20 connect each top surface electrode 26 with the associated bottom surface electrode 26. Bottom surface electrodes 28 are connected by two conductors 40 located on the bottom surface at the bonding area 14. The conductors 40 are arranged so that each extends from the bottom surface electrode 28 on tine 20 to one of the other bottom surface electrodes. The conductors 40 are located along the outer perimeter of the bonding area 14 so that an area is left open in the center of the bonding area for securing transducer 10 to mounting pylon 12. Conductors 42, which wrap around each vertex formed where two tines 16, 18 or 20 intersect, provide an electrical path between the conductors 40 and the top surface electrodes 28. Each conductor 42 extends from a conductor 40 adjacent a bottom surface electrode 28 to a top surface electrode 28 on an adjacent tine. Specifically, the conductor 42 connected to the conductor 40 adjacent the bottom side electrode 28 on tine 16 is connected to the top surface electrode 28 on tine 20; conductor 42 connected to the conductor 40 adjacent the bottom side electrode 28 on tine 18 is connected to the top surface electrode 28 on tine 20; and, conductor 42 connected to conductor 40 adjacent bottom surface electrode 28 of tine 20 is connected to top surface electrode 28 of tine 18.

A voltage is applied across the electrodes 26 and 28 at connection points 46 and 48, respectively. Connection point 46 is located on the conductive triangle 36 associated with the top surface electrodes 26. Connection point 48 is located on the end of a spur conductor 50 located on the top surface of bonding area 14 and integral with the conductor 42 attached to the top surface electrode 28 on tine 18. Conductors, such as wire bonded gold wires, are connected between the connection points 46 and 48 and an appropriate power supply to supply a voltage necessary to cause the tines to vibrate (wires and power supply not shown).

When a voltage is applied to the transducer 10 the tines 16, 18 and 20 twist as depicted in FIG. 1. Electrodes 26 and 28 are not shown in this figure so that the movement of the transducer 10 may be more clearly illustrated. Applying a voltage to the transducer 10 causes each tine 16, 18 and 20 to twist about its longitudinal axis, as represented by arrows 24, in the same direction and the same degree of displacement at the same instant. In the depicted embodiment it would appear from the top surface of bonding area 14 that each tine 16, 18, and 20 was twisting in a clockwise rotation. The torsional moments along the adjacent edges of two adjacent tines 16, 18 or 20 are thus equal and opposite, or reverse symmetric, with respect to each other. Consequently, where the torsional moments of two tines 16, 18 or 20 intersect, they cancel.

In the depicted transducer 10, the effect of the cancellation of the torsional moments is most readily apparent at the points where the edges of adjacent tines 16, 18 or 20 intersect. At point 56, where tine 16, tine 18, and bonding area 14 intersect, the transducer 10 is being twisted downward by the "into the paper" movement of the adjacent portion of tine 16. Simultaneously though, transducer 10 at point 56 is turned upward by the "out of the paper" movement of the adjacent portion of tine 18. The reverse symmetric moments to which point 56 is exposed cancel each other. Consequently, transducer 10 at point 56 does not move even though the adjacent tines 16 and 18 are vibrating. The same canceling of reverse symmetric torsional moments that occurs at point 56 occurs at point 58 between tines 18 and 20 and at point 60 between tines 20 and 16.

The reverse torsional moments of the individual tines 16, 18 and 20 serve also to substantially cancel out the torsional moment of the transducer 10 between the "motionless" points 56, 58 and 60. Specifically, the reverse torsional moments of the adjacent sections of tines 16 and 18 and of the adjacent sections of tines 18 and 20 substantially eliminate the torsional moment along line 62 between points 56 and 58. The reverse torsional moments of the adjacent tines 16, 18 and 20 similarly reduce to near zero the torsional movement along line 64 between points 58 and 60, which separates tine 20 from bonding area 14, and there is no movement along line 66, which separates tine 16 from the bonding area. Thus, there is essentially no torsional moment along lines 62, 64 and 66 which define the bonding area 14. Consequently, there is no movement within bonding area 14 even though the adjacent tines 16, 18, and 20 are excited into vibration.

An advantage of transducer 10 of this invention is that it has a relatively large section, the bonding area 14, that does not move when the rest of the transducer vibrates. Consequently, the torsional energy of the transducer 10 is not lost through the bonding area 14 to the adjacent mounting pylon 12 and sensor housing 22. Since the loss of torsional energy by the transducer is essentially eliminated, the amount of input energy required to maintain the torsional movement of the tines 16, 18, and 20 is similarly reduced. Moreover, since the torsional energy loss of the transducer 10 is essentially eliminated, the transducer has a relatively high quality factor; that is, the resonant frequency of the transducer is very well defined. This makes the transducer 10 well suited to precisely measure ambient temperature.

Furthermore, since there is practically no transfer of torsional energy into the sensor housing 22, the housing is not subjected to any twisting that can, in turn, be transferred as mechanical energy through the housing to other transducers mounted nearby. Also, since the bonding area 14-mounting pylon 12 interface is not subjected to twisting, the transducer 10 remains securely fastened to the sensor housing 22. This feature makes the transducer especially appropriate for use in environments where a sensor may be subjected to a significant amount of mechanical shock. Moreover, since the bonding area 14 provides a relatively large section for securing the transducer to a sensor frame, the need to provide the transducer with an additional mounted appendage is eliminated. This reduces both the overall size and complexity of manufacturing the transducer.

Still another advantage of the transducer 10 is that it has essentially identical mounted and unmounted resonant frequencies. This simplifies the production of temperature sensor assemblies that employ these transducers.

Another feature of transducer 10 is that the arrangement of the electrodes 26 and 28 and their associated conductors does not include any electrical paths that cross. This eliminates the need, when manufacturing the transducer, to apply an insulating layer at selected points to avoid electrical shorts. This similarly eliminates the need to factor in the mass of an insulating layer when mounting the transducer 10, since balancing of the transducer would otherwise be affected by the additional mass. Still another advantage of the electrode 26 and 28 and conductor arrangement is that the connection points 46 and 48 are essentially located in the center of the electrodes. This ensures that the voltages will be applied uniformly throughout the transducer 10 so that the tines will twist in a symmetric pattern.

Figure 4:
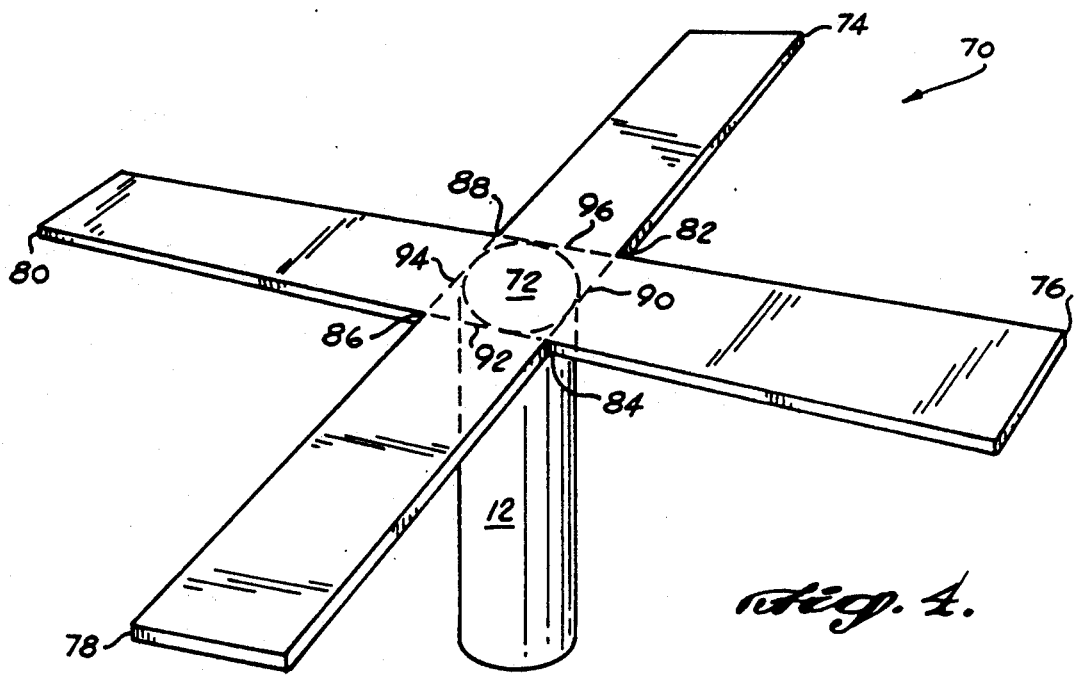
FIG. 4 is a perspective view of an alternative embodiment of a crystal temperature sensor of this invention.

An alternative transducer 70 constructed in accordance with this invention is described with reference to FIG. 4. The transducer 70 includes a square bonding area 72 from which four tines 74, 76, 78, and 80 extend at 90° angles from each other. The transducer 70 is formed of material which has a four-fold symmetry such that if the transducer were rotated 90° about bonding area 72, the molecular structure of the transducer would appear unchanged. Electrodes (not illustrated) are positioned on the tines 74–80 so that when a voltage is applied, the tines twist in the same direction having the same amount of displacement at the same time.

When a voltage is applied to transducer 70, tines 74, 76, 78 and 80 twist in a torsional mode about their longitudinal axes. The adjacent edges of adjacent tines 74, 76, 78 or 80 have reverse symmetric torsional moments. At locations on the transducer 70 where torsional moments of adjacent tines 74, 76, 78 or 80 intersect, the moments cancel each other and the torsional motion is essentially reduced to zero. For example, at point 82 where tines 74 and 76 intersect the torsional moments of the adjacent edges of the tines cancel and the transducer 70 is motionless. Point 84, between tines 76 and 78, point 86 between tines 78 and 80, and point 88 between tines 80 and 74 are exposed to the same type of reverse-symmetric torsional moments and likewise do not move. The reverse symmetric motion of the adjacent tines 74, 76, 78 or 80 also minimizes the torsional moment at the other locations where they intersect. Consequently, along line 90 between points 82 and 84, the reverse symmetric motion of the adjacent portions of tines 74 and 76 and of the adjacent portions of tines 76 and 78 minimizes the torsional moment to near zero. The torsional moment is similarly all but eliminated along line 92 between points 84 and 86, along line 94 between points 86 and 88, and along line 96 between points 88 and 82.

Since there is essentially no torsional moment along lines 90-96, the area within the lines, bonding area 72, does not move even though the rest of the transducer 70 is excited into vibration. Thus, bonding area 72 does not function as a transfer region through which energy is sunk from or supplied to transducer 70.

An advantage of providing transducers of this invention with more than three tines is that as the number of tines increases, the relative size of the bonding area of the transducer similarly increases. This is useful for providing a relatively large interface area to which the transducer may be attached to a portion of a sensor housing. This feature may be desirable in situations where the transducer will be subjected to extremely intense mechanical shock and a large interface area is required to ensure that the transducer will remain secured to the housing.

The foregoing description has been limited to specific embodiments of this invention. It will be apparent, however, from the description that the invention can be practiced using torsionally vibrating transducers of types not specifically described in the foregoing description. For example, while in the described preferred embodiments the torsional moments of the adjacent edges of the adjacent tines are equal and opposite, reverse symmetric, in still other embodiments of the invention the torsional moments may only need be opposite. This may be all that is required if the characteristics of the material forming the crystal is such that the opposite moments, even though unequal, will cancel each other out. Also, while only three- and four-tine embodiments of the invention have been disclosed, it is readily apparent that transducers according to this invention may be made of five or more tines. Moreover, in the illustrated embodiments of the invention the tines are generally beam shaped and have a uniform cross-sectional profile, while in alternative embodiments beams may be otherwise shaped such that they have cross-sectional profiles that vary along their length.

Furthermore, the described construction of the transducer out of an integral piece of material is similarly meant to be illustrative and not limiting. In some embodiments of the invention, it may be desirable to form the transducer out of multiple pieces of material. For example, it may be desirable to form a transducer according to this invention out of two beam-shaped pieces of piezoelectric material arranged in the shape of a cross. The end sections of each beam would function as the individual tines and the area where they intersect would serve as the bonding area.

In still other embodiments of the invention, the bonding area of a transducer may not be in the shape of a polygon. Thus, in some embodiments of the invention, it may be desirable to provide a transducer with a bonding area having a circular or at least a partially arcuate shape. In these versions of the invention the tines may extend outwards from the bonding area in a manner similar to how spokes extend from the wheel of a hub. In other embodiments of the invention the bonding area may still be formed in shape of a polygon, yet each side of the bonding area may not have a tine extending therefrom. Alternatively, the tine-bonding area interface may be substantially less than the entire length of the side of the bonding area.

Moreover, while in the disclosed embodiments of the invention the transducer is secured to a single mounting pylon, other arrangements to secure a transducer into a sensor housing may be possible. For instance, in environments where the transducer would be subjected to very intense environmental mechanical shock, it may be desirable to clamp the transducer between an upward oriented mounting pylon and a downward oriented inverted pylon. Alternatively, it may be desirable to form a hole in the center of the bonding area so that the transducer is mounted to a wire thread or other appropriate mechanical structure that is extended through the opening.

In still other embodiments of the invention, it may be desirable to use electrode and conductor arrangements different than what is taught in the disclosed embodiment. In these embodiments it may, for example, be desirable to cross conductors over from each other, which would of course necessitate placing some insulating material between the conductors. Similarly, while it is preferred that the tines be symmetrically arranged around the bonding area, other embodiments may have different types of tine arrangements. For example, in a four-tine transducer, the molecular structure of the material forming the transducer or other factors may dictate the tines being a generally X arrangement wherein they are separated from each other by angles of 45° and 135°. These embodiments of the invention would also differ from the disclosed embodiments in that their bonding areas would not have equilateral profiles.

Therefore, it is an object of the appended claims to cover all such modifications and variations as come within the true spirit and scope of the invention.

The embodiments of the invention in which an exclusive property or privilege is claimed are defined as follows:

1. A temperature transducer comprising: a structure having a bonding area and at least three vibrating tines extending from said bonding area wherein, each said tine and at least a portion of said bonding are formed out of an integral piece of material, said tines are formed of a material so that said tines have a frequency of torsional vibration that is a function of temperature and a torsional moment associated with said vibration and said tines are arranged so that torisonal moments of adjacent edges of said tines are opposite each other; and, a plurality of electrodes attached to said structure wherein, there is at least one more electrode than there are tines, at least one electrode is attached to each said tine for applying a voltage to said tine and said electrodes are connected so that said tines have an identical said torsional moment.

2. The temperature transducer of claim 1, wherein said transducer structure is formed from crystalline quartz.

3. The temperature transducer of claim 1 further including at least two electrodes on each said tine for applying a voltage to said tines, said electrodes connected so that said tines have an identical said torsionsal moment.

4. The temperature transducer of claim 1, wherein torsional moments if said adjacent edges of said adjacent tines are reverse symmetric.

5. The temperature transducer of claim 4 wherein said integral piece of material is crystalline and quartz.

6. The temperature transducer of claim 1, including four said vibrating tines.

7. The temperature transducer of claim 6 wherein said tines are spaced 90° from each other and said bonding area has a square cross-sectional profile.

8. The temperature transducer of claim 1, wherein said tines are formed at least partially out of piezoelectric material.

9. The temperature transducer of claim 8 wherein said tines are formed entirely out of piezoelectric material.

10. The temperature transducer of claim 8 further including at least electrodes on each said tine for applying a voltage to said tines, said electrodes connected so that said tines have an identical said torsional moment.

11. The temperature transducer of claim 9 further including at least two electrodes on each said tine for applying a voltage to said tines, said electrodes connected so that said tines have an identical said torsional moment.

12. The temperature transducer of claim 11, wherein said tines are symmetrically arranged about said bonding area and said bonding area has equilateral boundaries.

13. The temperature transducer of claim 12 wherein torsional moments of said adjacent edges of said adjacent tines are reverse symmetric.

14. The temperature transducer of claim 10 further including at least two electrodes on each said tine for applying a voltage to said tines, and said electrodes are connected so that said tines have an identical torsional moment.

15. The temperature transducer of claim 12 wherein each said tine includes four electrodes, two of a first potential and two of a second potential, said electrodes on each tine arranged so that said electrodes of opposed potential are adjacent each other and said electrodes of a common potential are diagonally opposed to each other.

16. The temperature transducer of claim 15 wherein said electrodes of a common potential are connected together by conductors on said material and said conductors are arranged so that conductors connecting electrodes having a different potential are spaced apart from each other.

17. The temperature transducer of claim 11, wherein said transducer structure is formed out of an integral piece of material.

18. The temperature transducer of claim 17 wherein said tines are symmetrically arranged about said bonding area and said bonding area has equilateral boundaries.

19. The temperature transducer of claim 18 wherein torsional moments of said adjacent edges of said adjacent tines are reverse symmetric.

20. The temperature transducer of claim 18 wherein each said tine includes four electrodes, two of a first potential and two of a second potential, said electrodes on each tine arranged so that said electrodes of opposed potential are adjacent each other and said electrodes of a common potential are diagonally opposed to each other, conductors on said transducer connect electrodes of a common potential together, and said conductors are arranged so that conductors connecting electrodes having a different potential are spaced apart from each other.

21. The temperature transducer of claim 17 wherein torsional moments of said adjacent edges of said adjacent tines are reverse symmetric.

22. The temperature transducer of claim 21 wherein said integral piece of material is crystalline and quartz.

23. The temperature transducer of claim 21 wherein said temperature transducer includes three said vibrating tines spaced 120° apart from each other.

24. The temperature transducer of claim 23 wherein said bonding area is in the form of an equilateral triangle.

25. The temperature transducer of claim 23 further including at least two electrodes on each said tine for applying a voltage to said tines, said electrodes connected so that said tines have an identical said torsional moment.

26. The temperature transducer of claim 25 wherein each said tine includes four electrodes, two of a first potential and two of a second potential, said electrodes on each tine arranged so that said electrodes of opposed potential are adjacent each other and said electrodes of a common potential are diagonally opposed to each other.

27. The temperature transducer of claim 25 wherein said electrodes of a common potential are connected together by conductors on said material and said conductors are arranged so that conductors connecting electrodes having a different potential are spaced apart from each other.

28. A temperature transducer comprising: a bonding area having equilateral boundaries; at least three vibrating tines that extend symmetrically from said bonding area wherein, said tines are formed of a material so as to have a frequency of torsional vibration that is a function of temperature and a torsional moment associated with said vibration and said tines are arranged so that torsional moments of adjacent edges of adjacent said tines are opposite each other; and, at least two electrodes on each said tine for applying a voltage to said tines wherein, said electrodes are connected so that said tines have an identical torsional moment.

29. The temperature transducer of claim 28, wherein at least two said electrodes have a common potential and said common potential electrodes are connected together by a conductor.

30. The temperature transducer of claim 29, wherein said conductor is at least partially located on a tine with which one of said common potential electrodes is associated.

* * * * *